US011625336B2

United States Patent
Lea (10) Patent No.: US 11,625,336 B2
(45) Date of Patent: *Apr. 11, 2023

(54) ENCRYPTION OF EXECUTABLES IN COMPUTATIONAL MEMORY

(71) Applicant: Micron Technology, Inc., Boise, ID (US)

(72) Inventor: Perry V. Lea, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 190 days.

This patent is subject to a terminal disclaimer.

(21) Appl. No.: 16/907,929

(22) Filed: Jun. 22, 2020

(65) Prior Publication Data

US 2020/0320020 A1    Oct. 8, 2020

Related U.S. Application Data

(63) Continuation of application No. 16/004,663, filed on Jun. 11, 2018, now Pat. No. 10,691,620, which is a
(Continued)

(51) Int. Cl.
*G06F 12/14* (2006.01)
*G06F 21/79* (2013.01)
(Continued)

(52) U.S. Cl.
CPC ...... *G06F 12/1408* (2013.01); *G06F 12/0897* (2013.01); *G06F 12/1009* (2013.01);
(Continued)

(58) Field of Classification Search
CPC ............... G06F 12/1408; G06F 21/602; G06F 2212/1052
See application file for complete search history.

(56) References Cited

U.S. PATENT DOCUMENTS 4,380,046 A    4/1983   Fung
4,435,792 A    3/1984   Bechtolsheim
(Continued)

FOREIGN PATENT DOCUMENTS

CN         102141905      8/2011
EP           0214718      3/1987
(Continued)

OTHER PUBLICATIONS

Extended European Search Report for related EP Application No. 20173040.5, dated Sep. 18, 2020, 8 pages.
(Continued)

*Primary Examiner* — Mohammed Waliullah
(74) *Attorney, Agent, or Firm* — Brooks, Cameron & Huebsch, PLLC (57) ABSTRACT

The present disclosure is related to encryption of executables in computational memory. Computational memory can traverse an operating system page table in the computational memory for a page marked as executable. In response to finding a page marked as executable, the computational memory can determine whether the page marked as executable has been encrypted. In response to determining that the page marked as executable is not encrypted, the computational memory can generate a key for the page marked as executable. The computational memory can encrypt the page marked as executable using the key.

20 Claims, 6 Drawing Sheets

Related U.S. Application Data continuation of application No. 14/828,151, filed on Aug. 17, 2015, now Pat. No. 9,996,479.

(51) Int. Cl.
  *G06F 21/12* (2013.01)
  *G06F 12/1009* (2016.01)
  *G06F 12/0897* (2016.01)
  *G06F 15/78* (2006.01)

(52) U.S. Cl.
  CPC ............ *G06F 21/126* (2013.01); *G06F 21/79* (2013.01); *G06F 15/7821* (2013.01); *G06F 2212/1016* (2013.01); *G06F 2212/1052* (2013.01)

(56) References Cited

U.S. PATENT DOCUMENTS

| | | |
|---|---|---|
| 4,435,793 A | 3/1984 | Ochii |
| 4,727,474 A | 2/1988 | Batcher |
| 4,843,264 A | 6/1989 | Galbraith |
| 4,958,378 A | 9/1990 | Bell |
| 4,977,542 A | 12/1990 | Matsuda et al. |
| 5,023,838 A | 6/1991 | Herbert |
| 5,034,636 A | 7/1991 | Reis et al. |
| 5,201,039 A | 4/1993 | Sakamura |
| 5,210,850 A | 5/1993 | Kelly et al. |
| 5,253,308 A | 10/1993 | Johnson |
| 5,276,643 A | 1/1994 | Hoffmann et al. |
| 5,325,519 A | 6/1994 | Long et al. |
| 5,367,488 A | 11/1994 | An |
| 5,379,257 A | 1/1995 | Matsumura et al. |
| 5,386,379 A | 1/1995 | Ali-Yahia et al. |
| 5,398,213 A | 3/1995 | Yeon et al. |
| 5,440,482 A | 8/1995 | Davis |
| 5,446,690 A | 8/1995 | Tanaka et al. |
| 5,473,576 A | 12/1995 | Matsui |
| 5,481,500 A | 1/1996 | Reohr et al. |
| 5,485,373 A | 1/1996 | Davis et al. |
| 5,506,811 A | 4/1996 | McLaury |
| 5,615,404 A | 3/1997 | Knoll et al. |
| 5,638,128 A | 6/1997 | Hoogenboom |
| 5,638,317 A | 6/1997 | Tran |
| 5,654,936 A | 8/1997 | Cho |
| 5,678,021 A | 10/1997 | Pawate et al. |
| 5,724,291 A | 3/1998 | Matano |
| 5,724,366 A | 3/1998 | Furutani |
| 5,751,987 A | 5/1998 | Mahant-Shetti et al. |
| 5,787,458 A | 7/1998 | Miwa |
| 5,854,636 A | 12/1998 | Watanabe et al. |
| 5,867,429 A | 2/1999 | Chen et al. |
| 5,870,504 A | 2/1999 | Nemoto et al. |
| 5,915,084 A | 6/1999 | Wendell |
| 5,935,263 A | 8/1999 | Keeth et al. |
| 5,986,942 A | 11/1999 | Sugibayashi |
| 5,991,209 A | 11/1999 | Chow |
| 5,991,785 A | 11/1999 | Alidina et al. |
| 6,005,799 A | 12/1999 | Rao |
| 6,009,020 A | 12/1999 | Nagata |
| 6,092,186 A | 7/2000 | Betker et al. |
| 6,122,211 A | 9/2000 | Morgan et al. |
| 6,125,071 A | 9/2000 | Kohno et al. |
| 6,134,164 A | 10/2000 | Lattimore et al. |
| 6,147,514 A | 11/2000 | Shiratake |
| 6,151,244 A | 11/2000 | Fujino et al. |
| 6,157,578 A | 12/2000 | Brady |
| 6,163,862 A | 12/2000 | Adams et al. |
| 6,166,942 A | 12/2000 | Vo et al. |
| 6,172,918 B1 | 1/2001 | Hidaka |
| 6,175,514 B1 | 1/2001 | Henderson |
| 6,181,698 B1 | 1/2001 | Hariguchi |
| 6,208,544 B1 | 3/2001 | Beadle et al. |
| 6,226,215 B1 | 5/2001 | Yoon |
| 6,301,153 B1 | 10/2001 | Takeuchi et al. |
| 6,301,164 B1 | 10/2001 | Manning et al. |
| 6,304,477 B1 | 10/2001 | Naji |
| 6,389,507 B1 | 5/2002 | Sherman |
| 6,418,498 B1 | 7/2002 | Martwick |
| 6,466,499 B1 | 10/2002 | Blodgett |
| 6,510,098 B1 | 1/2003 | Taylor |
| 6,563,754 B1 | 5/2003 | Lien et al. |
| 6,578,058 B1 | 6/2003 | Nygaard |
| 6,731,542 B1 | 5/2004 | Le et al. |
| 6,754,746 B1 | 6/2004 | Leung et al. |
| 6,768,679 B1 | 7/2004 | Le et al. |
| 6,807,614 B2 | 10/2004 | Chung |
| 6,816,422 B2 | 11/2004 | Hamade et al. |
| 6,819,612 B1 | 11/2004 | Achter |
| 6,894,549 B2 | 5/2005 | Eliason |
| 6,943,579 B1 | 9/2005 | Hazanchuk et al. |
| 6,948,056 B1 | 9/2005 | Roth et al. |
| 6,950,771 B1 | 9/2005 | Fan et al. |
| 6,950,898 B2 | 9/2005 | Merritt et al. |
| 6,956,770 B2 | 10/2005 | Khalid et al. |
| 6,961,272 B2 | 11/2005 | Schreck |
| 6,965,648 B1 | 11/2005 | Smith et al. |
| 6,985,394 B2 | 1/2006 | Kim |
| 6,987,693 B2 | 1/2006 | Cernea et al. |
| 7,020,017 B2 | 3/2006 | Chen et al. |
| 7,028,170 B2 | 4/2006 | Saulsbury |
| 7,045,834 B2 | 5/2006 | Tran et al. |
| 7,054,178 B1 | 5/2006 | Shiah et al. |
| 7,061,817 B2 | 6/2006 | Raad et al. |
| 7,079,407 B1 | 7/2006 | Dimitrelis |
| 7,173,857 B2 | 2/2007 | Kato et al. |
| 7,187,585 B2 | 3/2007 | Li et al. |
| 7,196,928 B2 | 3/2007 | Chen |
| 7,260,565 B2 | 8/2007 | Lee et al. |
| 7,260,672 B2 | 8/2007 | Garney |
| 7,372,715 B2 | 5/2008 | Han |
| 7,400,532 B2 | 7/2008 | Aritome |
| 7,406,494 B2 | 7/2008 | Magee |
| 7,447,720 B2 | 11/2008 | Beaumont |
| 7,454,451 B2 | 11/2008 | Beaumont |
| 7,457,181 B2 | 11/2008 | Lee et al. |
| 7,535,769 B2 | 5/2009 | Cernea |
| 7,546,438 B2 | 6/2009 | Chung |
| 7,562,198 B2 | 7/2009 | Noda et al. |
| 7,574,466 B2 | 8/2009 | Beaumont |
| 7,602,647 B2 | 10/2009 | Li et al. |
| 7,663,928 B2 | 2/2010 | Tsai et al. |
| 7,685,365 B2 | 3/2010 | Rajwar et al. |
| 7,692,466 B2 | 4/2010 | Ahmadi |
| 7,752,417 B2 | 7/2010 | Manczak et al. |
| 7,791,962 B2 | 9/2010 | Noda et al. |
| 7,796,453 B2 | 9/2010 | Riho et al. |
| 7,805,587 B1 | 9/2010 | Van Dyke et al. |
| 7,808,854 B2 | 10/2010 | Takase |
| 7,827,372 B2 | 11/2010 | Bink et al. |
| 7,869,273 B2 | 1/2011 | Lee et al. |
| 7,898,864 B2 | 3/2011 | Dong |
| 7,924,628 B2 | 4/2011 | Danon et al. |
| 7,937,535 B2 | 5/2011 | Ozer et al. |
| 7,957,206 B2 | 6/2011 | Bauser |
| 7,979,667 B2 | 7/2011 | Allen et al. |
| 7,996,749 B2 | 8/2011 | Ding et al. |
| 8,042,082 B2 | 10/2011 | Solomon |
| 8,045,391 B2 | 10/2011 | Mokhlesi |
| 8,059,438 B2 | 11/2011 | Chang et al. |
| 8,095,825 B2 | 1/2012 | Hirotsu et al. |
| 8,117,462 B2 | 2/2012 | Snapp et al. |
| 8,164,942 B2 | 4/2012 | Gebara et al. |
| 8,208,328 B2 | 6/2012 | Hong |
| 8,213,248 B2 | 7/2012 | Moon et al. |
| 8,223,568 B2 | 7/2012 | Seo |
| 8,238,173 B2 | 8/2012 | Akerib et al. |
| 8,274,841 B2 | 9/2012 | Shimano et al. |
| 8,279,683 B2 | 10/2012 | Klein |
| 8,310,884 B2 | 11/2012 | Iwai et al. |
| 8,332,367 B2 | 12/2012 | Bhattacherjee et al. |
| 8,339,824 B2 | 12/2012 | Cooke |
| 8,339,883 B2 | 12/2012 | Yu et al. |
| 8,347,154 B2 | 1/2013 | Bahali et al. |

(56) References Cited

U.S. PATENT DOCUMENTS

| | | |
|---|---|---|
| 8,351,292 B2 | 1/2013 | Matano |
| 8,356,144 B2 | 1/2013 | Hessel et al. |
| 8,417,921 B2 | 4/2013 | Gonion et al. |
| 8,462,532 B1 | 6/2013 | Argyres |
| 8,484,276 B2 | 7/2013 | Carlson et al. |
| 8,495,438 B2 | 7/2013 | Roine |
| 8,503,250 B2 | 8/2013 | Demone |
| 8,526,239 B2 | 9/2013 | Kim |
| 8,533,245 B1 | 9/2013 | Cheung |
| 8,555,037 B2 | 10/2013 | Gonion |
| 8,599,613 B2 | 12/2013 | Abiko et al. |
| 8,605,015 B2 | 12/2013 | Guttag et al. |
| 8,625,376 B2 | 1/2014 | Jung et al. |
| 8,644,101 B2 | 2/2014 | Jun et al. |
| 8,650,232 B2 | 2/2014 | Stortz et al. |
| 8,799,678 B2 * | 8/2014 | Buer ............... G06F 21/72 713/190 |
| 8,873,272 B2 | 10/2014 | Lee |
| 8,964,496 B2 | 2/2015 | Manning |
| 8,971,124 B1 | 3/2015 | Manning |
| 9,015,390 B2 | 4/2015 | Klein |
| 9,047,193 B2 | 6/2015 | Lin et al. |
| 9,165,023 B2 | 10/2015 | Moskovich et al. |
| 9,292,684 B2 * | 3/2016 | Guidry ............... H04L 63/061 |
| 2001/0007112 A1 | 7/2001 | Porterfield |
| 2001/0008492 A1 | 7/2001 | Higashiho |
| 2001/0010057 A1 | 7/2001 | Yamada |
| 2001/0028584 A1 | 10/2001 | Nakayama et al. |
| 2001/0043089 A1 | 11/2001 | Forbes et al. |
| 2002/0059355 A1 | 5/2002 | Peleg et al. |
| 2002/0194389 A1 * | 12/2002 | Worley, Jr. .......... G06F 9/4812 719/310 |
| 2003/0167426 A1 | 9/2003 | Slobodnik |
| 2003/0222879 A1 | 12/2003 | Lin et al. |
| 2004/0073592 A1 | 4/2004 | Kim et al. |
| 2004/0073773 A1 | 4/2004 | Demjanenko |
| 2004/0085840 A1 | 5/2004 | Vali et al. |
| 2004/0095826 A1 | 5/2004 | Perner |
| 2004/0154002 A1 | 8/2004 | Ball et al. |
| 2004/0205289 A1 | 10/2004 | Srinivasan |
| 2004/0240251 A1 | 12/2004 | Nozawa et al. |
| 2005/0015557 A1 | 1/2005 | Wang et al. |
| 2005/0078514 A1 | 4/2005 | Scheuerlein et al. |
| 2005/0097417 A1 | 5/2005 | Agrawal et al. |
| 2006/0047937 A1 | 3/2006 | Selvaggi et al. |
| 2006/0069849 A1 | 3/2006 | Rudelic |
| 2006/0146623 A1 | 7/2006 | Mizuno et al. |
| 2006/0149804 A1 | 7/2006 | Luick et al. |
| 2006/0181917 A1 | 8/2006 | Kang et al. |
| 2006/0215432 A1 | 9/2006 | Wickeraad et al. |
| 2006/0225072 A1 | 10/2006 | Lari et al. |
| 2006/0291282 A1 | 12/2006 | Liu et al. |
| 2007/0103986 A1 | 5/2007 | Chen |
| 2007/0171747 A1 | 7/2007 | Hunter et al. |
| 2007/0180006 A1 | 8/2007 | Gyoten et al. |
| 2007/0180184 A1 | 8/2007 | Sakashita et al. |
| 2007/0195602 A1 | 8/2007 | Fong et al. |
| 2007/0285131 A1 | 12/2007 | Sohn |
| 2007/0285979 A1 | 12/2007 | Turner |
| 2007/0291532 A1 | 12/2007 | Tsuji |
| 2008/0025073 A1 | 1/2008 | Arsovski |
| 2008/0037333 A1 | 2/2008 | Kim et al. |
| 2008/0052711 A1 | 2/2008 | Forin et al. |
| 2008/0137388 A1 | 6/2008 | Krishnan et al. |
| 2008/0162805 A1 * | 7/2008 | Springfield ......... G06F 12/0866 711/E12.019 |
| 2008/0165601 A1 | 7/2008 | Matick et al. |
| 2008/0178053 A1 | 7/2008 | Gorman et al. |
| 2008/0215937 A1 | 9/2008 | Dreibelbis et al. |
| 2009/0019290 A1 | 1/2009 | Ye et al. |
| 2009/0067218 A1 | 3/2009 | Graber |
| 2009/0113210 A1 * | 4/2009 | Westerinen ........... G06F 21/52 713/187 |
| 2009/0154238 A1 | 6/2009 | Lee |
| 2009/0154273 A1 | 6/2009 | Borot et al. |
| 2009/0254694 A1 | 10/2009 | Ehrman et al. |
| 2009/0254697 A1 | 10/2009 | Akerib |
| 2010/0067296 A1 | 3/2010 | Li |
| 2010/0091582 A1 | 4/2010 | Vali et al. |
| 2010/0172190 A1 | 7/2010 | Lavi et al. |
| 2010/0210076 A1 | 8/2010 | Gruber et al. |
| 2010/0226183 A1 | 9/2010 | Kim |
| 2010/0308858 A1 | 12/2010 | Noda et al. |
| 2010/0325446 A1 * | 12/2010 | Mordetsky ........... G06F 21/125 713/190 |
| 2010/0332895 A1 | 12/2010 | Billing et al. |
| 2011/0051523 A1 | 3/2011 | Manabe et al. |
| 2011/0063919 A1 | 3/2011 | Chandrasekhar et al. |
| 2011/0093662 A1 | 4/2011 | Walker et al. |
| 2011/0103151 A1 | 5/2011 | Kim et al. |
| 2011/0119467 A1 | 5/2011 | Cadambi et al. |
| 2011/0122695 A1 | 5/2011 | Li et al. |
| 2011/0140741 A1 | 6/2011 | Zerbe et al. |
| 2011/0219260 A1 | 9/2011 | Nobunaga et al. |
| 2011/0267883 A1 | 11/2011 | Lee et al. |
| 2011/0317496 A1 | 12/2011 | Bunce et al. |
| 2011/0321165 A1 | 12/2011 | Capalik et al. |
| 2012/0005397 A1 | 1/2012 | Lim et al. |
| 2012/0017039 A1 | 1/2012 | Margetts |
| 2012/0023281 A1 | 1/2012 | Kawasaki et al. |
| 2012/0110348 A1 | 5/2012 | Hofstee et al. |
| 2012/0120705 A1 | 5/2012 | Mitsubori et al. |
| 2012/0134216 A1 | 5/2012 | Singh |
| 2012/0134225 A1 | 5/2012 | Chow |
| 2012/0134226 A1 | 5/2012 | Chow |
| 2012/0140540 A1 | 6/2012 | Agam et al. |
| 2012/0182798 A1 | 7/2012 | Hosono et al. |
| 2012/0195146 A1 | 8/2012 | Jun et al. |
| 2012/0198310 A1 | 8/2012 | Tran et al. |
| 2012/0246380 A1 | 9/2012 | Akerib et al. |
| 2012/0265964 A1 | 10/2012 | Murata et al. |
| 2012/0281486 A1 | 11/2012 | Rao et al. |
| 2012/0303627 A1 | 11/2012 | Keeton et al. |
| 2012/0303880 A1 | 11/2012 | Min et al. |
| 2013/0003467 A1 | 1/2013 | Klein |
| 2013/0055252 A1 | 2/2013 | Lagar-Cavilla et al. |
| 2013/0061006 A1 | 3/2013 | Hein |
| 2013/0107623 A1 | 5/2013 | Kavalipurapu et al. |
| 2013/0117541 A1 | 5/2013 | Choquette et al. |
| 2013/0124783 A1 | 5/2013 | Yoon et al. |
| 2013/0132702 A1 | 5/2013 | Patel et al. |
| 2013/0138646 A1 | 5/2013 | Sirer et al. |
| 2013/0163362 A1 | 6/2013 | Kim |
| 2013/0173888 A1 | 7/2013 | Hansen et al. |
| 2013/0191651 A1 | 7/2013 | Muff et al. |
| 2013/0205114 A1 | 8/2013 | Badam et al. |
| 2013/0219112 A1 | 8/2013 | Okin et al. |
| 2013/0227361 A1 | 8/2013 | Bowers et al. |
| 2013/0283122 A1 | 10/2013 | Anholt et al. |
| 2013/0286705 A1 | 10/2013 | Grover et al. |
| 2013/0326154 A1 | 12/2013 | Haswell |
| 2013/0332707 A1 | 12/2013 | Gueron et al. |
| 2014/0185395 A1 | 7/2014 | Seo |
| 2014/0215185 A1 | 7/2014 | Danielsen |
| 2014/0237261 A1 | 8/2014 | Diep et al. |
| 2014/0250279 A1 | 9/2014 | Manning |
| 2014/0344934 A1 | 11/2014 | Jorgensen |
| 2015/0029798 A1 | 1/2015 | Manning |
| 2015/0039812 A1 | 2/2015 | Piwonka |
| 2015/0042380 A1 | 2/2015 | Manning |
| 2015/0063052 A1 | 3/2015 | Manning |
| 2015/0078108 A1 | 3/2015 | Cowles et al. |
| 2015/0120987 A1 | 4/2015 | Wheeler |
| 2015/0134713 A1 | 5/2015 | Wheeler |
| 2015/0186296 A1 | 7/2015 | Guidry |
| 2015/0324290 A1 | 11/2015 | Leidel |
| 2015/0325272 A1 | 11/2015 | Murphy |
| 2016/0378688 A1 * | 12/2016 | Rozas ............... G06F 12/1441 713/190 |

FOREIGN PATENT DOCUMENTS

| | | |
|---|---|---|
| EP | 2026209 | 2/2009 |
| JP | H0831168 | 2/1996 |

(56) References Cited

FOREIGN PATENT DOCUMENTS

| JP | 2009259193 | 3/2015 | | |
|---|---|---|---|---|
| KR | 10-0211482 | 8/1998 | | |
| KR | 10-2010-0134235 | 12/2010 | | |
| KR | 10-2013-0049421 | 5/2013 | | |
| WO | 2001065359 | 9/2001 | | |
| WO | 2008054456 | 5/2008 | | |
| WO | 2010079451 | 7/2010 | | |
| WO | 2013062596 | 5/2013 | | |
| WO | 2013081588 | 6/2013 | | |
| WO | 2013095592 | 6/2013 | | |
| WO | WO-2016085492 A1 * | 6/2016 | ......... | G06F 12/1027 |

OTHER PUBLICATIONS

Boyd et al., "On the General Applicability of Instruction-Set Randomization", Jul.-Sep. 2010, (14 pgs ), vol. 7, Issue 3, IEEE Transactions on Dependable and Secure Computing.

Stojmenovic, "Multiplicative Circulant Networks Topological Properties and Communication Algorithms", (25 pgs ), Discrete Applied Mathematics 77 (1997) 281-305.

"4.9.3 MINLOC and MAXLOC", Jun. 12, 1995, (5pgs), Message Passing Interface Forum 1.1, retrieved from http://www.mpi-forum.org/docs/mpi-1.1/mpi-11-html/node79.html.

Derby, et al., "A High-Performance Embedded DSP Core with Novel SIMD Features", Apr. 6-10, 2003, (4 pgs), vol. 2, pp. 301-304, 2003 IEEE International Conference on Accoustics, Speech, and Signal Processing.

Debnath, Biplob, Bloomflash: Bloom Filter on Flash-Based Storage, 2011 31st Annual Conference on Distributed Computing Systems, Jun. 20-24, 2011, 10 pgs.

Pagiamtzis, Kostas, "Content-Addressable Memory Introduction", Jun. 25, 2007, (6 pgs.), retrieved from: http://www.pagiamtzis.com/cam/camintro.

Pagiamtzis, et al., "Content-Addressable Memory (CAM) Circuits and Architectures: A Tutorial and Survey", Mar. 2006, (16 pgs ), vol. 41, No. 3, IEEE Journal of Solid-State Circuits.

International Search Report and Written Opinion for PCT Application No. PCT/US2013/043702, dated Sep. 26, 2013, (11 pgs.).

Elliot, et al., "Computational RAM: Implementing Processors in Memory", Jan.-Mar. 1999, (10 pgs.), vol. 16, Issue 1, IEEE Design and Test of Computers Magazine.

Dybdahl, et al., "Destructive-Read in Embedded DRAM, Impact on Power Consumption," Apr. 2006, (10 pgs.), vol. 2, Issue 2, Journal of Embedded Computing-Issues in embedded single-chip multicore architectures.

Kogge, et al., "Processing in Memory: Chips to Petaflops," May 23, 1997, (8 pgs.), retrieved from: http://www.es.ucf.edu/courses/cda5106/summer02/papers/kogge97PIM.pdf.

Draper, et al., "The Architecture of the DIVA Processing-In-Memory Chip," Jun. 22-26, 2002, (12 pgs.), ICS '02, retrieved from: http://www.isi.edu/~draper/papers/ics02.pdf.

Adibi, et al., "Processing-In-Memory Technology for Knowledge Discovery Algorithms," Jun. 25, 2006, (10 pgs.), Proceeding of the Second International Workshop on Data Management on New Hardware, retrieved from: http://www.cs.cmu.edu/~damon2006/pdf/adibi06inmemory.pdf.

U.S. Appl. No. 13/449,082, entitled, "Methods and Apparatus for Pattern Matching," filed Apr. 17, 2012, (37 pgs.).

U.S. Appl. No. 13/743,686, entitled, "Weighted Search and Compare in a Memory Device," filed Jan. 17, 2013, (25 pgs.).

U.S. Appl. No. 13/774,636, entitled, "Memory as a Programmable Logic Device," filed Feb. 22, 2013, (30 pgs.).

U.S. Appl. No. 13/774,553, entitled, "Neural Network in a Memory Device," filed Feb. 22, 2013, (63 pgs.).

U.S. Appl. No. 13/796,189, entitled, "Performing Complex Arithmetic Functions in a Memory Device," filed Mar. 12, 2013, (23 pgs.).

Office Action for related Taiwan Patent Application No. 105125524, dated Feb. 12, 2018, 25 pages.

International Search Report and Written Opinion for related PCT Application No. PCT/US2016/043841, dated Nov. 2, 2016, 14 pages.

Extended European Search Report for EP Application No. 16837468.4, dated Mar. 27, 2019, 5 pages.

Notice of Preliminary Rejection for related Korea Patent Application No. 10-2018-7006915, dated Jun. 10, 2019, 9 pages.

* cited by examiner

ENCRYPTION OF EXECUTABLES IN COMPUTATIONAL MEMORY

PRIORITY INFORMATION

This application is a Continuation of U.S. application Ser. No. 16/004,663, filed Jun. 11, 2018, which issues as U.S. Pat. No. 10,691,620 on Jun. 23, 2020, which is a Continuation of U.S. application Ser. No. 14/828,151, filed Aug. 17, 2015, which issued as U.S. Pat. No. 9,996,479 on Jun. 12, 2018, the contents of which are included herein by reference.

TECHNICAL FIELD

The present disclosure relates generally to semiconductor memory and methods, and more particularly, to encryption of executables in computational memory.

BACKGROUND

Memory devices are typically provided as internal, semiconductor, integrated circuits in computing devices or other electronic devices. There are many different types of memory including volatile and non-volatile memory. Volatile memory can require power to maintain its data (e.g., user data, error data, etc.) and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), such as spin torque transfer random access memory (STT RAM), among others.

Computing systems often include a number of processing resources (e.g., one or more processors), which may retrieve and execute instructions and store the results of the executed instructions to a suitable location. A processor can comprise a number of functional units (e.g., herein referred to as functional unit circuitry (FUC)) such as arithmetic logic unit (ALU) circuitry, floating point unit (FPU) circuitry, and/or a combinatorial logic block, for example, which can execute instructions to perform logical operations such as AND, OR, NOT, NAND, NOR, and XOR logical operations on data (e.g., one or more operands).

A number of components in a computing system may be involved in providing instructions to the functional unit circuitry for execution. The instructions may be generated, for instance, by a processing resource such as a controller and/or host processor. Data (e.g., the operands on which the instructions will be executed to perform the logical operations) may be stored in a memory array that is accessible by the FUC. The instructions and/or data may be retrieved from the memory array and sequenced and/or buffered before the FUC begins to execute instructions on the data. Furthermore, as different types of operations may be executed in one or multiple clock cycles through the FUC, intermediate results of the operations and/or data may also be sequenced and/or buffered. In many instances, the processing resources (e.g., processor and/or associated FUC) may be external to the memory array, and data can be accessed (e.g., via a bus between the processing resources and the memory array) to execute instructions. Data can be moved from the memory array to registers external to the memory array via a bus.

DETAILED DESCRIPTION

Most modern computer architectures use a register-memory technique, where operations are executed in two separate domains. Logical operations (e.g., arithmetic, flow control, and combinatorial operations) are generally executed on a number of register files. Memory operations (e.g., load, store, etc.) are generally executed on memory devices. Instructions in register-memory architectures utilize register indices or memory addresses to indicate how/where to perform an operation.

Computational memory, such as processing in memory (PIM) or processing near memory devices can be classified as memory-memory devices in computing architecture taxonomies. In computational memory, both logical operations and memory operations are performed on the memory devices in-situ. Instructions in memory-memory architectures use physical addresses to indicate how/where to perform an operation.

Attempts to attack or insert malicious software into a computing system usually include a virus or malware that alters the instruction flow or instructions executed by the host processor. Some embodiments of the present disclosure use computational memory to encrypt executables (executable instructions such as host processor instructions). The encryption can polymorphically randomize the executables such that an attacker would have to know the encryption state to inject malevolent software that would have a negative effect on such a system. Randomization of executables can obfuscate and/or change the executable to create an ecosystem of binary diversity, which can reduce and/or eliminate a source of malware and/or system compromises. Any malicious software that attempts to inject code (e.g., binary injection, buffer overflow attacks, Morris worm, Code Red, Blaster Virus, uniform resource locator (URL) heap exploits, etc.) would have to understand the underlying instruction set architecture in order to run code.

The present disclosure is related to encryption of executables in computational memory. Computational memory can traverse an operating system page table in the computational memory for a page marked as executable. In response to finding a page marked as executable, the computational memory can determine whether the page marked as executable has been encrypted. In response to determining that the page marked as executable is not encrypted, the computational memory can generate a key for the page marked as executable. The computational memory can encrypt the page marked as executable using the key. Some embodiments of the present disclosure provide encryption for executables, but not data, which advantageously allows data to be changed, read, written, etc. without an encryption and/or decryption process, while providing protection for executables, which may be the target of particular attacks. Executable instructions are referred to generally herein as executables.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "M" and "N", particularly with respect to reference numerals in the drawings, indicates that a number of the particular feature so designated can be included. As used herein, "a number of" a particular thing can refer to one or more of such things (e.g., a number of memory devices can refer to one or more memory devices). As used herein, the terms "first" and "second" are used to differentiate between one feature from another and do not necessarily imply an order between the features so designated.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Multiple analogous elements within one figure may be referenced with a reference numeral followed by a hyphen and another numeral or a letter. For example, 240-1 may reference element 20-1 in FIGS. 2 and 240-N may reference element 40-N, which can be analogous to element 240-1. Such analogous elements may be generally referenced without the hyphen and extra numeral or letter. For example, elements 240-1, . . . , 240-N may be generally referenced as 240. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
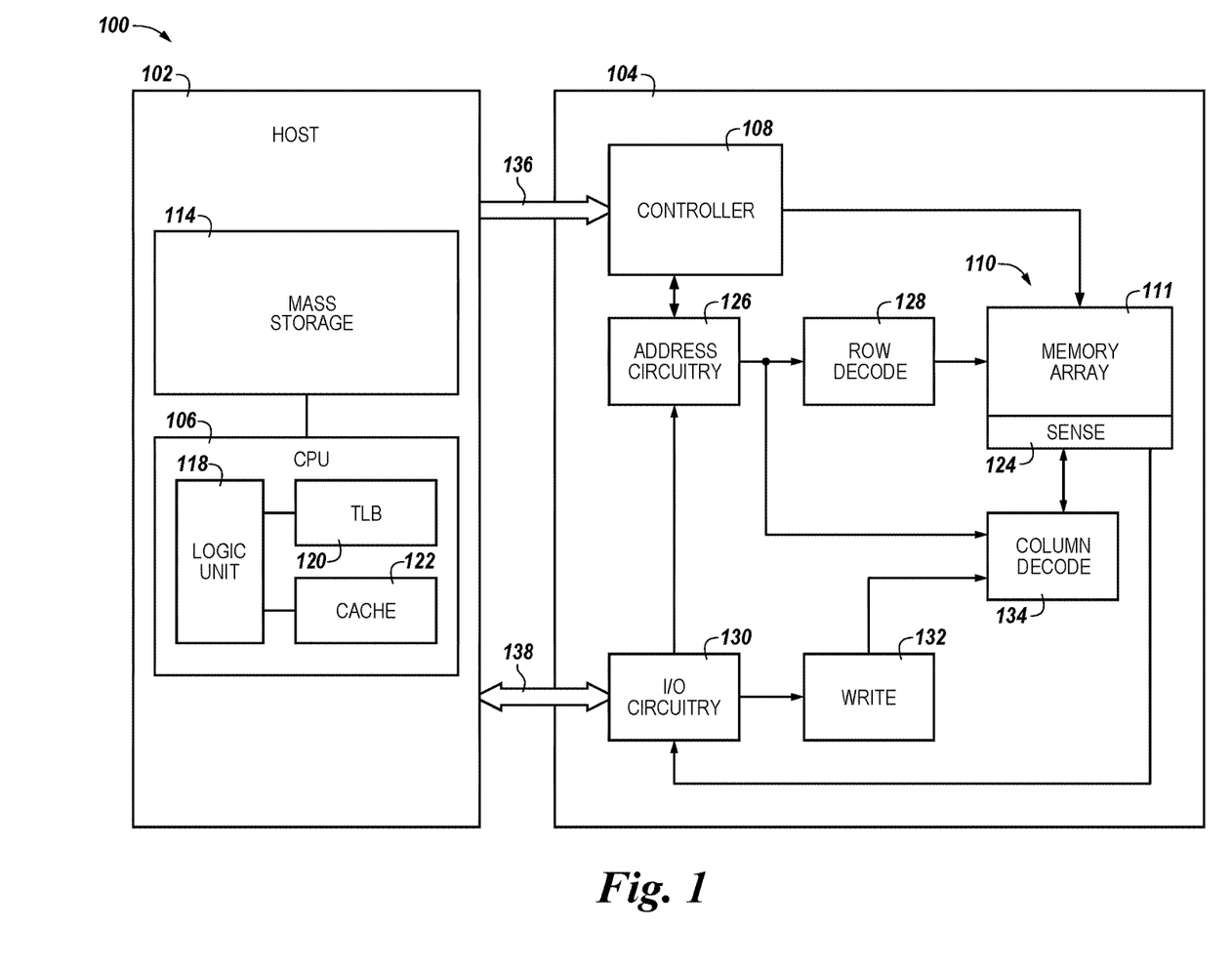
FIG. 1 is a block diagram of an apparatus in the form of a computing system including at least one computational memory system in accordance with a number of embodiments of the present disclosure.

FIG. 1 is a block diagram of an apparatus in the form of a computing system 100 including at least one computational memory system 104 in accordance with a number of embodiments of the present disclosure. As used herein, a host 102, a computational memory system 104, a computational memory device 110, a memory array 111, and/or sensing circuitry 124, including sensing amplifiers and compute circuitry might each also be separately considered an "apparatus."

The computing system 100 can include a host 102 coupled to the computational memory system 104, which includes a computational memory device 110 (e.g., including a memory array 111 and/or sensing circuitry 124). The computational memory system 104 can act as a conventional memory and/or a computational memory. The host 102 can be a host system such as a personal laptop computer, a desktop computer, a digital camera, a mobile telephone, or a memory card reader, among various other types of hosts. The host 102 can include a system motherboard and/or backplane and can include a number of processing resources (e.g., one or more processors, microprocessors, or some other type of controlling circuitry), such as central processing unit (CPU) 106. The CPU 106 can be coupled to mass storage 114. The mass storage 114 can be a storage device or other media not directly accessible by the CPU 106 such as hard disk drives, solid state drives, optical disc drives, and can be non-volatile memory. In some embodiments, the mass storage 114 can be external to the host 102. The host 102 can be configured with an operating system. The operating system is executable instructions (software) that manages hardware resources and provides services other executable instructions (applications) that run on the operating system. The operating system can implement a virtual memory system.

The CPU 106 can include a logic unit 118 coupled to a translation lookaside buffer (TLB) 120 and CPU cache 122. An example of a logic unit 118 is an arithmetic logic unit (ALU), which is a circuit that can perform arithmetic and bitwise logic operations on integer binary numbers. A number of ALUs can be used to function as a floating point unit (FPU), which is a circuit that operates on floating point numbers and/or a graphics processing unit (GPU), which is a circuit that accelerates the creation of images in a frame buffer intended for output to a display. The TLB 120 is a cache that memory management hardware can use to improve virtual address translation speed. The TLB 120 can be a content addressable memory, where the search key is a virtual address and the search result is a physical address. As described in more detail with respect to FIGS. 3-5, the TLB 120 can include operating system page table entries, which map virtual addresses to physical addresses and the operating system page table can be stored in memory (e.g., in the memory array 130). The CPU cache 122 can be an intermediate stage between relatively faster registers and relatively slower main memory (not specifically illustrated). Data to be operated on by the CPU 106 may be copied to CPU cache 122 before being placed in a register, where the operations can be effected by the logic unit 118. Although not specifically illustrated, the CPU cache 122 can be a multilevel hierarchical cache.

The computing system 100 can include separate integrated circuits or both the host 102 and the computational memory system 104 can be on the same integrated circuit. The computing system 100 can be, for instance, a server system and/or a high performance computing system and/or a portion thereof. Although the example shown in FIG. 1 illustrates a system having a Von Neumann architecture, embodiments of the present disclosure can be implemented in non-Von Neumann architectures (e.g., a Turing machine), which may not include one or more components (e.g., CPU, ALU, etc.) often associated with a Von Neumann architecture.

For clarity, the computing system 100 has been simplified to focus on features with particular relevance to the present disclosure. The memory array 111 can be a hybrid memory cube (HMC), computational memory such as a processing in memory random access memory (PIMRAM) array, which can include one or more of a DRAM array, SRAM array, STT RAM array, PCRAM array, TRAM array, RRAM array, NAND flash array, and/or NOR flash array, for instance. The memory array 111 can comprise memory cells arranged in rows coupled by access lines (which may be referred to herein as word lines or select lines) and columns coupled by sense lines (which may be referred to herein as digit lines or data lines). Although a single computational memory device 110 is shown in FIG. 1, embodiments are not so limited. For instance, the computational memory system 104 may include a number of computational memory devices 110 (e.g., a number of banks of DRAM cells).

The computational memory system 104 can include address circuitry 126 to latch address signals provided over an input/output "I/O" bus 138 (e.g., data bus and/or address bus) through I/O circuitry 130 (e.g., provided to external ALU circuitry and to DRAM DQs via local I/O lines and global I/O lines). Address signals can be received and decoded by a row decoder 128 and a column decoder 134 to access the computational memory device 110. Data can be read from the memory array 111 by sensing voltage and/or current changes on the sense lines using sensing circuitry 124. The sensing circuitry 124 can read and latch a page (e.g., row) of data from the memory array 111. The I/O circuitry 130 can be used for bi-directional data communication with host 102 over the I/O bus 138. The write circuitry 132 can be used to write data to the computational memory device 110.

Controller 108 can decode signals provided by control bus 136 from the host 102. These signals can include chip enable signals, write enable signals, and address latch signals that are used to control memory operations performed on the computational memory device 110, including data read, data write, and data erase operations. The signals can also be used to control logical operations performed on the computational memory device 110 including arithmetic, flow control, and combinatorial operations, among others. In various embodiments, the controller 108 is responsible for executing instructions from the host 102. The controller 108 can be a state machine, a sequencer, a processor, and/or other control circuitry.

In some previous approaches, data associated with a logical operation, for instance, would be read from memory via sensing circuitry and provided to external ALU circuitry via I/O lines (e.g., via local I/O lines and/or global I/O lines). The external ALU circuitry could include a number of registers and would perform logical operations using the data (which may be referred to as operands or inputs), and the result would be transferred back to the array via the I/O lines. In contrast, in a number of embodiments of the present disclosure, sensing circuitry 124 is configured to perform logical operations on data stored in memory array 111 and store the result back to the memory array 111 without enabling an I/O line (e.g., a local I/O line) coupled to the sensing circuitry 124. Enabling an I/O line can include enabling (e.g., turning on) a transistor having a gate coupled to a decode signal (e.g., a column decode signal) and a source/drain coupled to the I/O line. However, embodiments are not limited to not enabling an I/O line. For instance, in a number of embodiments, the sensing circuitry 124 can be used to perform logical operations without enabling column decode lines of the array; however, the local I/O line(s) may be enabled in order to transfer a result to a suitable location other than back to the array 111 (e.g., to an external register).

As such, in a number of embodiments, circuitry external to array 111 and sensing circuitry 124 is not needed to perform the logical operation as the sensing circuitry 124 can be operated to perform the logical operation using the address space of the memory array 111 without the use of an external processing resource. Therefore, the sensing circuitry 124 may be used to complement and/or to replace, at least to some extent, such an external processing resource (or at least the bandwidth consumption of such an external processing resource).

The sensing circuitry 124 can be formed on pitch with the memory cells of the array. Although not specifically illustrated, in some embodiments, additional peripheral sense amplifiers and/or logic (e.g., function components that each store instructions for execution of a logical function) can be coupled to the sensing circuitry 124. The sensing circuitry 124 and the peripheral sense amplifier and logic can cooperate in performing logical operations, according to embodiments described herein.

However, in a number of embodiments, the sensing circuitry 124 may be used to perform logical operations (e.g., to execute instructions) in addition to logical operations performed by an external processing resource (e.g., host 102). For instance, host 102 and/or sensing circuitry 124 may be limited to performing only certain logical operations and/or a certain number of logical operations.

An example of the sensing circuitry 124 is described further below in association with FIG. 2. For instance, in a number of embodiments, the sensing circuitry 124 can comprise a number of sense amplifiers and a number of compute components, which may comprise a latch serving as an accumulator and that can be used to perform logical operations (e.g., on data associated with complementary sense lines). Logical operations can include Boolean operations (e.g., AND, OR, NOR, XOR, etc.), combinations of Boolean operations to perform other mathematical operations, as well as non-Boolean operations. In a number of embodiments, the sensing circuitry 124 can be used to perform logical operations using data stored in the memory array 111 as inputs and store the results of the logical operations back to the memory array 111 without transferring via a sense line address access (e.g., without firing a column decode signal). As such, a logical operation can be performed using sensing circuitry 124 rather than and/or in addition to being performed by processing resources external to the sensing circuitry 124 (e.g., by the host CPU 106 and/or other processing circuitry, such as ALU circuitry, located on the computational memory system 104, such as on the controller 108, or elsewhere).

Figure 2:
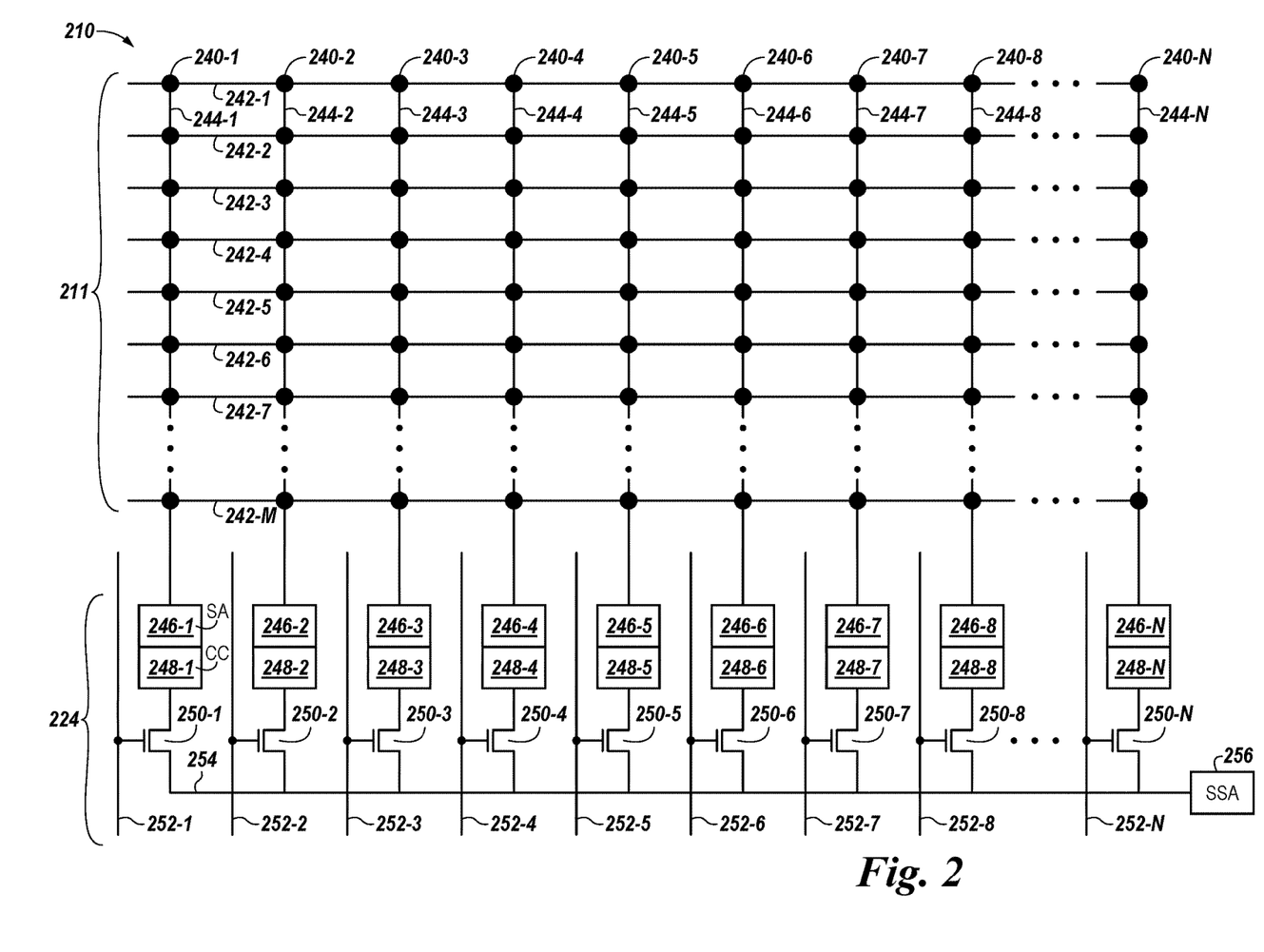
FIG. 2 is a schematic diagram of a portion of a computational memory device in accordance with a number of embodiments of the present disclosure.

FIG. 2 is a schematic diagram of a portion of a computational memory device 210 in accordance with a number of embodiments of the present disclosure. The computational memory device 210 is analogous to the computational memory device 110 illustrated in FIG. 1. The computational memory device 210 can include a memory array 211 that includes memory cells 240-1, 240-2, 240-3, 240-4, 240-5, 240-6, 240-7, 240-8, . . . , 240-N coupled to rows of access lines 242-1, 242-2, 242-3, 242-4, 242-5, 242-6, 242-7, . . . , 242-M and columns of sense lines 244-1, 244-2, 244-3, 244-4, 244-5, 244-6, 244-7, 244-8, . . . , 244-N. The memory array 211 is not limited to a particular number of access lines and/or sense lines, and use of the terms "rows" and "columns" does not intend a particular physical structure and/or orientation of the access lines and/or sense lines. Although not pictured, each column of memory cells can be associated with a corresponding pair of complementary sense lines.

Each column of memory cells can be coupled to sensing circuitry 224, which can be analogous to sensing circuitry 124 illustrated in FIG. 1. In this example, the sensing circuitry includes a number of sense amplifiers 246-1, 246-2, 246-3, 246-4, 246-5, 246-6, 246-7, 246-8, . . . , 246-N coupled to the respective sense lines 244. The sense amplifiers 246 are coupled to input/output (I/O) line 254 (e.g., a local I/O line) via access devices (e.g., transistors) 250-1, 250-2, 250-3, 250-4, 250-5, 250-6, 250-7, 250-8, . . . , 250-N. In this example, the sensing circuitry also includes a number of compute components 248-1, 248-2, 248-3, 248-4, 248-5, 248-6, 248-7, 248-8, . . . , 248-N coupled to the respective sense lines 244. Column decode lines 252-1, 252-2, 252-3, 252-4, 252-5, 252-6, 252-7, 252-8, . . . , 252-N are coupled to the gates of access devices 250 respectively, and can be selectively activated to transfer data sensed by respective sense amps 246 and/or stored in respective compute components 248 to a secondary sense amplifier 256. In a number of embodiments, the compute components 248 can be formed on pitch with the memory cells of their corresponding columns and/or with the corresponding sense amplifiers 246.

In a number of embodiments, the sensing circuitry (e.g., compute components 248 and sense amplifiers 246) is configured to perform a number of logical operations on elements stored in array 211. As an example, a first plurality of elements can be stored in a first group of memory cells coupled to a particular access line (e.g., access line 242-1) and to a number of sense lines 244, and a second plurality of elements can be stored in a second group of memory cells coupled to a different access line (e.g., access line 242-2) and the respective number of sense lines 244. Each element of the first plurality of elements can have a logical operation performed thereon with a respective one of the second plurality of elements, and the result of the logical operation can be stored (e.g., as a bit-vector) in a third group of memory cells coupled to a particular access line (e.g., access line 242-3) and to the number of sense lines 244.

Figure 3:
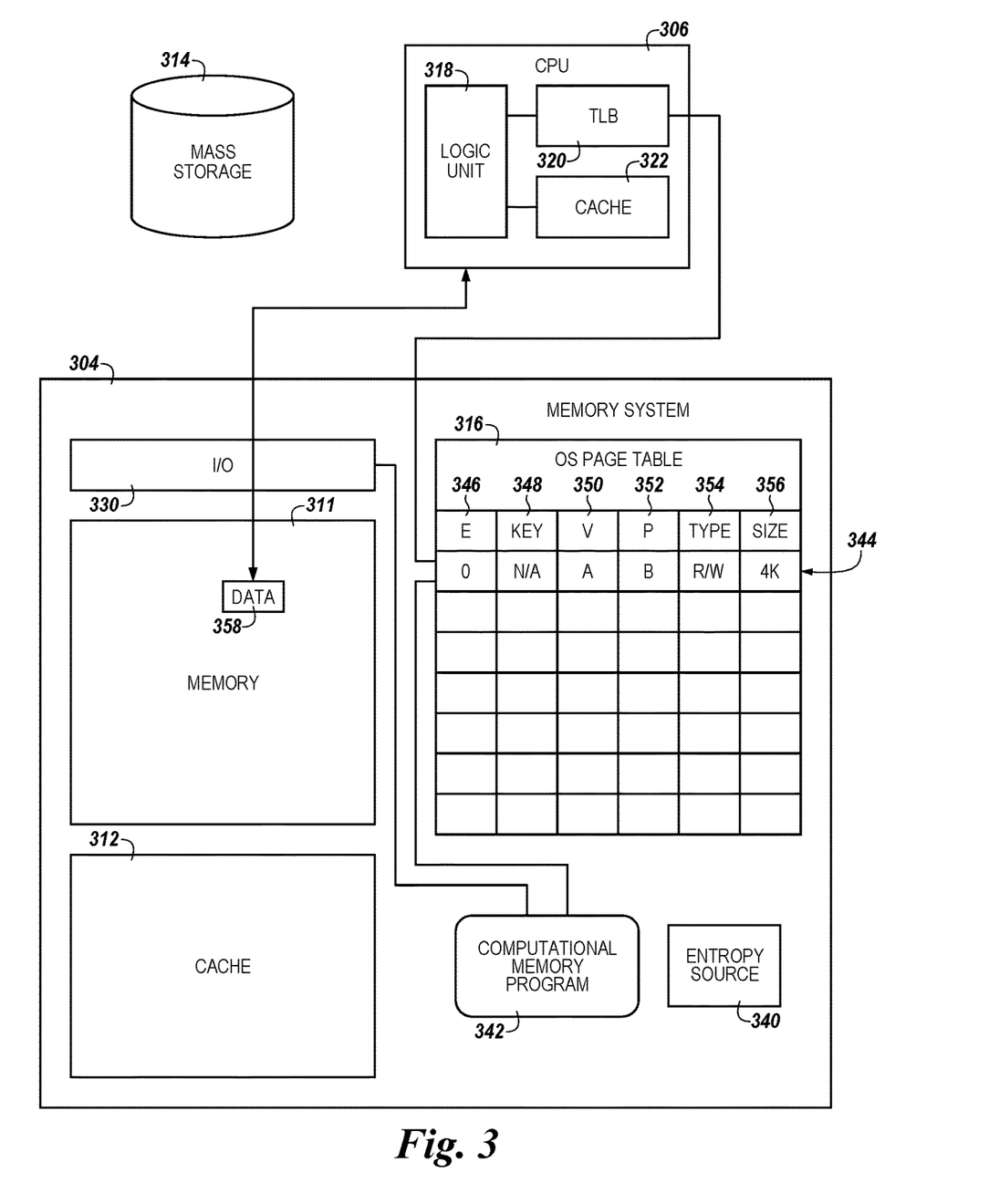
FIG. 3 is a block flow diagram illustrating a read or write access according to a number of embodiments of the present disclosure.

FIG. 3 is a block flow diagram illustrating a read or write access according to a number of embodiments of the present disclosure. FIGS. 3-6 illustrate different flow diagrams representing operations for analogous architectures. FIG. 3 includes an illustration of a mass storage device 314, which is analogous to the mass storage 114 described with respect to FIG. 1. The functionality of the mass storage device 314 is described in more detail with respect to FIG. 4. FIG. 3 includes a CPU 306, which is analogous to the CPU 106 illustrated in FIG. 1. The CPU 306 is illustrated as including a logic unit 318, TLB 320, and CPU cache 322. FIG. 3 includes a computational memory system 304 including I/O circuitry 330, memory array 311, and computational memory system cache 312. The computational memory system cache 312 is described in more detail with respect to FIGS. 5-6. The memory system 304 is analogous to the memory system 104 illustrated in FIG. 1. The memory system 304 is illustrated as including an operating system page table 316. Although the operating system page table 316 can be stored in the memory array 311, it is illustrated separately for ease of illustration and explanation. Likewise, the computational memory program 342 can be stored in the memory array 311, but is illustrated separately to highlight the functional flows described with respect to FIGS. 3-6. The memory system 304 can include an entropy source 340 as described in more detail below.

Some embodiments of the present disclosure can keep the CPU 306 and underlying architecture unchanged from what is conventional for CPUs. However, the computational memory system 304 can operate differently, and/or an operating system of a host can operate differently from what is conventional. Conventionally, the operating system can maintain an operating system page table, however according to the present disclosure, the computational memory system 304 can maintain an operating system page table 316 because the computational memory system 304 can encrypt and/or decrypt pages stored in memory and indicate the same in the operating system page table and can generate and store keys in the operating system page table for encrypted pages. The computational memory system 304 can generate a new key for an encrypted page and re-encrypt the page on the fly. The host CPU 306 can include a TLB 320 in its memory hierarchy, but the operating system page table 316 is stored in the memory array 311. On a page miss (e.g., when executables are loaded to the memory array 311) pages can be demand loaded from mass storage 314 and loaded and placed in reserved areas of physical and virtual memory. The reservation can be managed by the operating system and maintained in the operating system page table 316. The operating system page table 316 can be located in a reserved area of the memory array 311. For example, in an ARM architecture, the ARM memory management unit (MMU) can use registers TTB0 and TTB1 to point to the operating system page tables to allow for hardware walking of the tables in the event of a page fault.

As the operating system page table 316 is located in the memory array 311, the computational memory system 304 has programmatic access to the operating system page table 316 structures, meaning that the computational memory system 304 can make changes to the operating system page table 316. The operating system page table 316 can include a number of fields that indicate information about pages referenced by the operating system page table 316. Such fields can include an encryption indication field 346, a key field 348, a virtual address field 350, a physical address field 352, a page type field 354, and/or a size field 356. The encryption indication field 346 can indicate whether the corresponding page is encrypted (e.g., by a bit value of 1 for yes or a bit value of 0 for no). The key field 348 can store a key for the corresponding page if the corresponding page is encrypted. If the corresponding page is not encrypted, a key may not be stored in the key field 348 for the corresponding page as it would be unnecessary. The virtual address field 350 can store a virtual address corresponding to the page. The physical address field 352 can store a physical address corresponding to the page. The page type field 352 can mark the type of the corresponding page (e.g., read "R", write "W", read/write "R/W", or executable "X"). The type of the page indicates, among other things, whether the page stores data or executables. The size field 356 can indicate a size of the corresponding page (e.g., 4k). An example of a table is shown in Table 1.

TABLE 1

| Encrypted | Key | Virtual | Physical | Type | Page Size |
|---|---|---|---|---|---|
| 1 | 0xA8F01 . . . | 0x80010000 | 0x01000000 | X | 4k |
| 0 | NA | 0x40A00000 | 0x01100000 | R | 1 MB |
| 1 | 0xBB16B . . . | 0x80080000 | 0x01080000 | X | 4k |
| 0 | NA | 0x60A08000 | 0x00001000 | R/W | 4k |

In some embodiments, the operating system page table 316 may not be cached so as to preserve coherence between information in the operating system page table 316, the CPU 306, and the memory array 311. The computational memory system 304 can be configured (e.g., programmed) to traverse the operating system page table 316 in the memory array 311 (e.g., for a page marked as executable). For example, the computational memory system 304 can include a computational memory program 342 that can handle traversing the operating system page table 316. Pages referenced in the operating system page table 316 can store either data or executables. Thus, a page referenced in the operating system page table 316 can be marked as executable by a marking in the page type field 354. Page types read, write, and read/write can mark data pages (a page that stores data) and page type executable can mark a page that is executable (a page that store executable instructions).

The computational memory system 304 can be configured to encrypt and/or decrypt executables. For example, the computational memory system 304 can include a computational memory program 342 that can handle encryption and/or decryption of executables. In some embodiments the computational memory program 342 can handle encryption and/or decryption of executables as they are populated in the computational memory system 304 during a page fault and/or as they are read from the computational memory system 304 (e.g., during a cache line refill from the CPU 306). An indication of whether a page is encrypted can be stored in the encryption indication field 346. In some embodiments, the host operating system can launch the computational memory program 342 in the computational memory system 304 (e.g., on startup) as indicated by the line between the I/O circuitry 330 and the computational memory program 342. After the computational memory program 342 is running, the responsibility of the host operating system can end with respect to encryption.

The computational memory system 304 can include an entropy source 340 that can generate a key and/or be used to generate a key for a page marked as executable to encrypt the page with the key. The key can be generated based on a random number or near-random number generated with the entropy source 340. An example of the entropy source 340 is a phase-locked loop (PLL) frequency (e.g., a PLL clock), which can be sampled to generate a number to be used as a key. An example of the entropy source 340 is a serial number associated with the computational memory system 304, which can be sampled to generate a number to be used as a key and/or used as input to an algorithm that generates another value, which can be sampled (or used), to generate a number to be used as a key. An example of the entropy source 340 is a timer, which can be sampled to generate a number to be used as a key. In some embodiments, a key can be generated with a sampled PLL frequency exclusive or (XOR) with a sampled serial number XOR with a sampled timer. The computational memory system 304 can be configured to use unique keys generated with the entropy source 340 to encrypt or re-encrypt pages in the memory array 311. Other entropy sources and/or combinations of entropy sources can be used to generate a random or near-random number.

As described above, for data read or write operations, encryption, according to the present disclosure, is not necessary. The computational memory program 442 can grant access to a data page (a page marked as read, write, and/or read/write) in the operating system page table 316 without regard to encryption. Accordingly, a data page 358 can be transferred through I/O circuitry 330 between the memory array 311 and the CPU 306 (e.g., via the CPU cache 322) and stored in the memory array 311 or read from the memory array 311. For example, in a read/write operation, a virtual memory address (e.g., "A") from the TLB 320 can be transmitted from and/or to the computational memory system 304 and retrieved from and/or stored in the virtual address field 350 for the first table entry 344 corresponding to the data page 358 that is being written. A physical address (e.g., "B") corresponding to the virtual address can be retrieved from and/or stored in the physical address field 352 for the first table entry 344. This is indicated by the line running between the first table entry 344 and the TLB 320. Because what is being transferred is a data page 358 rather than executables, the computational memory program 342 can mark the page as not being encrypted (e.g., "0") in the encryption indication field 346 of the first table entry 344 as indicated by the line between the computational memory program 342 and the first table entry 344. The computational memory program may not store a key in the key field 348 (e.g., "N/A") of the first table entry 344 because it corresponds to a data page 358 that is not encrypted. The computational memory program 342 can store an indication that the data page 358 is read/write (e.g., "R/W") in the page type field 354 and an indication of the page size (e.g., "4k") in the size field 356.

Figure 4:
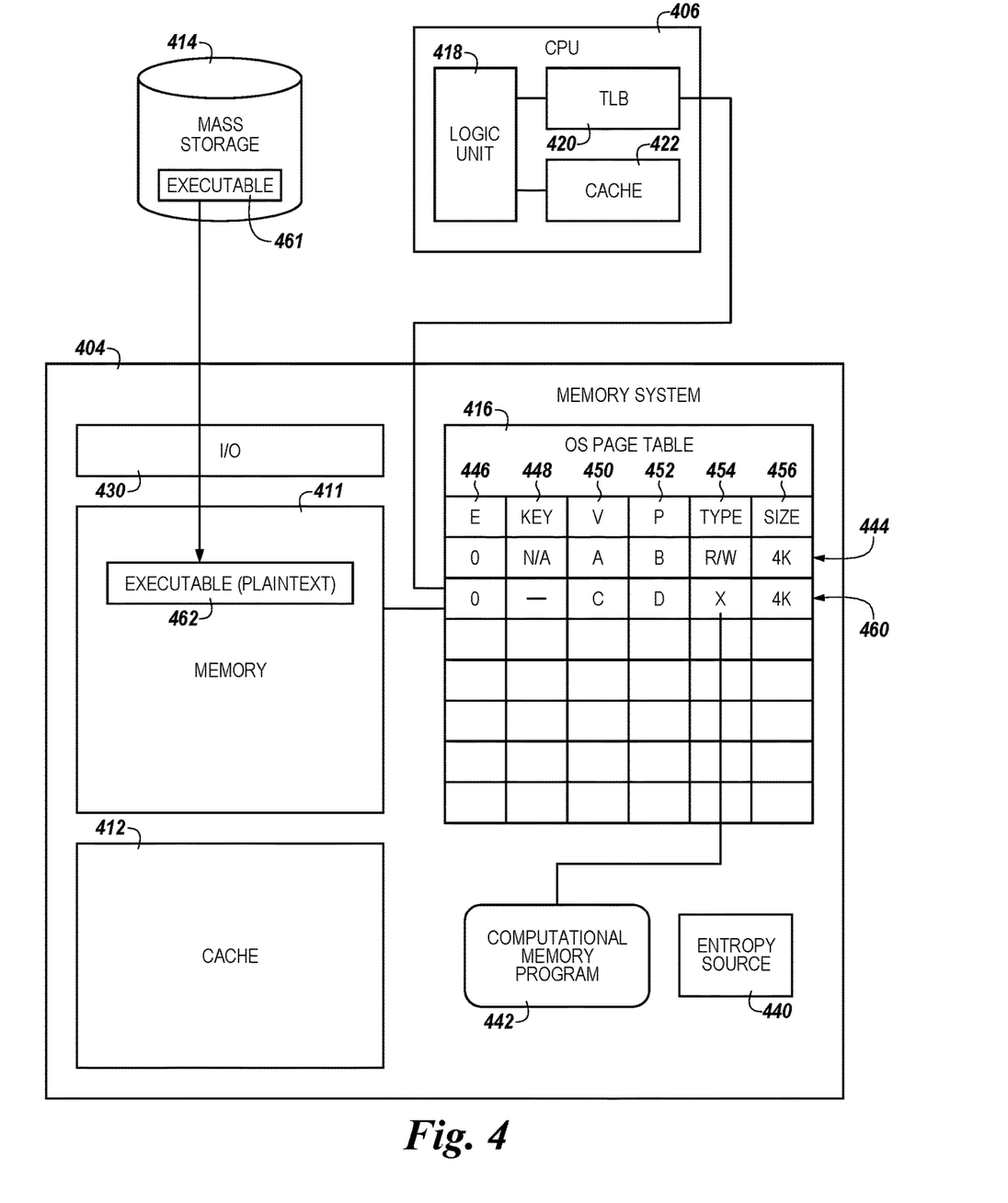
FIG. 4 is a block flow diagram illustrating a new page allocation according to a number of embodiments of the present disclosure.

FIG. 4 is a block flow diagram illustrating a new page allocation according to a number of embodiments of the present disclosure. FIG. 4 includes an illustration of a mass storage device 414 including executables 461. FIG. 4 includes a CPU 406 including a logic unit 418, TLB 420, and CPU cache 422. FIG. 4 includes a computational memory system 404 including I/O circuitry 430, memory array 411, computational memory system cache 412, operating system page table 416, computational memory program 442, and entropy source 440.

The mass storage 414 can store executables 461 for the CPU 406. The executables 461 can be loaded into the memory array 411 by direct memory access (DMA) from the mass storage device 414 as indicated by the arrow from the mass storage device 414 through the I/O circuitry 430 to the memory array 411. Initially, the executables 461 from the mass storage device 414 are stored in the memory array 411 as a plaintext executable page 462 because they were not encrypted in the mass storage device 414. The computational memory program 442 can create a second table entry 460 in the operating system page table 416 to correspond to the plaintext executable page 462 in the memory array 411.

Because the plaintext executable page 462 has not yet been encrypted, the computational memory program 442 can mark the plaintext executable page 462 as not being encrypted (e.g., "0") in the encryption indication field 446 of the second table entry 460. Likewise, a key is not stored in the key field 448 of the second table entry 460 (e.g., "-"). A virtual memory address (e.g., "C") from the TLB 420 can be transmitted to the computational memory system 404 and stored in the virtual address field 450 for the second table entry 460. A physical address (e.g., "D") corresponding to the virtual address can be stored in the physical address field 452 for the second table entry 460. This is indicated by the line running between the second table entry 460 and the TLB 420. The computational memory program can mark the plaintext executable page 462 as executable (e.g., "X") in the type field 454 of the second table entry 460 as indicated by the line between the computational memory program 442 and the second table entry 460. The correspondence between the plaintext executable page 462 not being encrypted and the indication as such is illustrated by the line between the memory array 411 and the second table entry 460. The computational memory program 442 can store an indication of the page size (e.g., "4k") in the size field 456.

Figure 5:
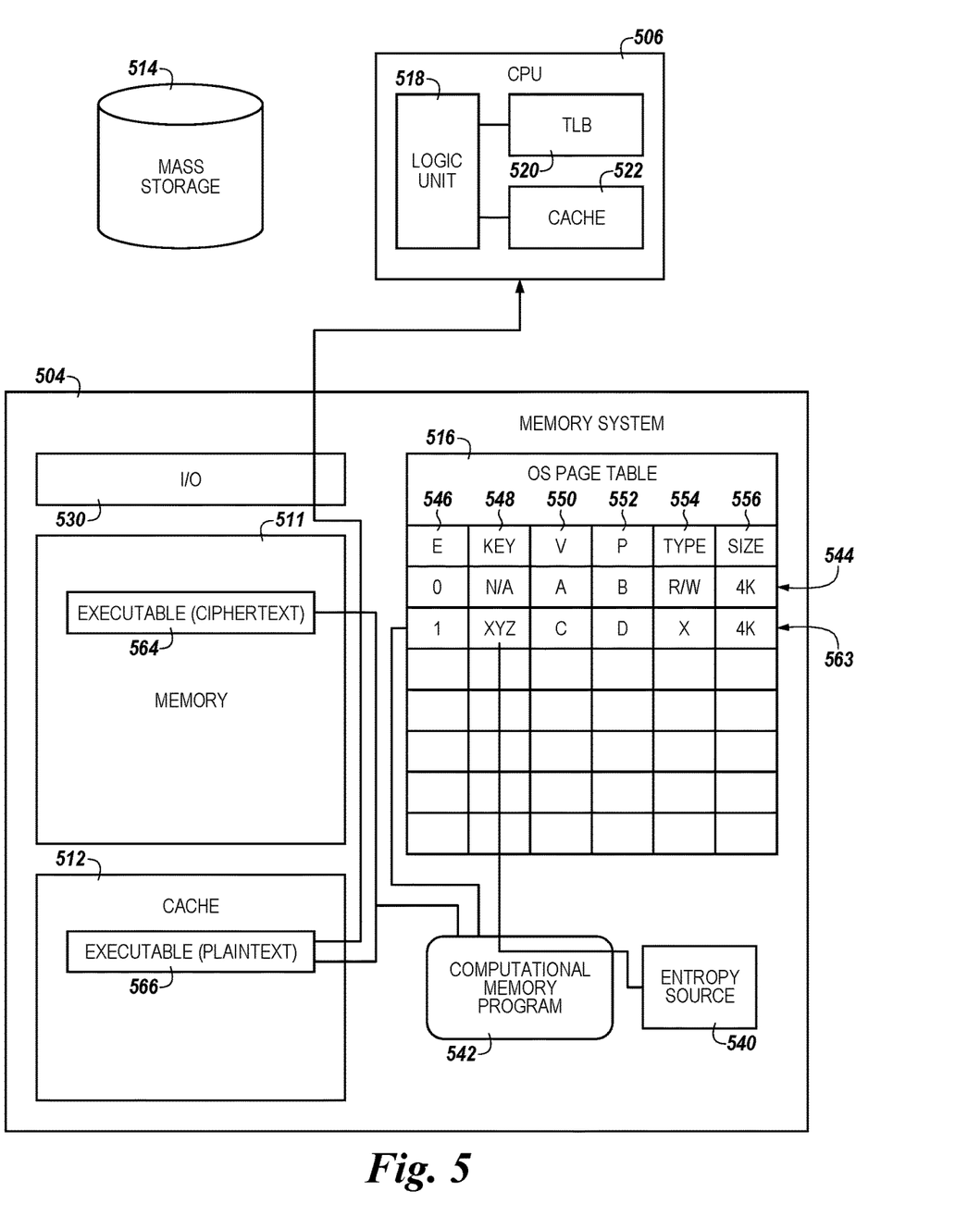
FIG. 5 is a block flow diagram illustrating encryption of executables according to a number of embodiments of the present disclosure.

FIG. 5 is a block flow diagram illustrating encryption of executables according to a number of embodiments of the present disclosure. FIG. 5 includes an illustration of a mass storage device 514. FIG. 5 includes a CPU 506 including a logic unit 518, TLB 520, and CPU cache 522. FIG. 5 includes a computational memory system 504 including I/O circuitry 530, memory array 511, computational memory system cache 512, operating system page table 516, computational memory program 542, and entropy source 540.

In FIG. 4, the executable 461 from the mass storage device 414 was initially stored in the memory array 411 as a plaintext executable 462. However, in FIG. 5, the computational memory program 542 can generate a key for the plaintext executable 462 using entropy source 540 and encrypt it to a ciphertext executable 564 and store it back to the memory array 511. Some examples of the encryption included advanced encryption standard (AES), such as AES 128 bit encryption, AES 256 bit encryption, etc., and data encryption standard (DES), among others. The computational memory program 542 can delete the second table entry 460 for the plaintext executable 462 and create a third table entry 563 for the ciphertext executable 564.

The computational memory program 542 can mark the ciphertext executable page 564 as being encrypted (e.g., "1") in the encryption indication field 546 of the third table entry 563. This is indicated by the line between the computational memory program 542 and the third table entry 563. The key generated to encrypt the page can be stored in the key field 548 of the third table entry 563 (e.g., "XYZ"). This is indicated by the line from the entropy source 540 through the computational memory program 542 to the key field 548 in the third table entry 563. The virtual memory address (e.g., "C") in the virtual address field 550, the physical address (e.g., "D") in the physical address field 552, the type (e.g., "X") in the type field 554, and the size (e.g., "4k") in the size field 556 for the third table entry 563 can remain the same as for the second table entry 460, however embodiments are not so limited, as, for example, the physical address could change.

The computational memory program 542 can copy the plaintext executable 462 (as illustrated in FIG. 4) before encrypting it as the ciphertext executable 564 and store it as plaintext executable 566 in the memory system cache 512. This is indicated by the lines between the computational memory 542, the ciphertext executable 564 and the plaintext executable 566. The computational memory system cache 512 can be a non-addressable (e.g., secure) area of the computational memory (e.g., of the computational memory system 504 and/or the memory array 511). The computational memory system cache 512 being non-addressable (e.g., by a host or DMA device, etc.) can secure the plaintext executable 566 because malevolent software cannot be injected by an external device such as a host or DMA device. The plaintext executable 566 in the computational memory system cache 512 can be used to satisfy additional instruction requests from the host and to hide some of the latency that may be caused by operation of the computational memory program 542. This is illustrated by the line from the plaintext executable 566 to the CPU 506.

The computational memory program 542 can traverse the operating system page table 516 (e.g., outside of any host operation and/or during idle time of the computational memory system 504 and/or the operating system page table 516) looking for pages marked as executable. In some embodiments, the computational memory program 542 can traverse the operating system page table 516 in response to receiving an instruction from a host in association with a page access (e.g., for a requested page). In response to finding a page marked as executable, the computational memory program 542 can determine whether the page marked as executable has been encrypted. Determining whether the requested page has been encrypted can be by reference to the operating system page table 516 that indicates whether pages are encrypted (e.g., by the encryption indication field 546) and whether pages are executable (e.g., by the type field 554). In response to determining that the page marked as executable is not encrypted, the computational memory program 542 can generate a key for the page marked as executable and encrypt the page using the key. The encrypted page can be stored in place of the unencrypted page (in place of the requested page where the encryption operation is in response to a request from a host). Finding a page marked as executable that has not been encrypted can imply that at some point the computational memory system 504 encountered a page fault and demand loaded a page into the memory array 511. Advantageously, the computational memory program 542 can remedy this by encrypting the page with a uniquely generated key so that it is more resilient to injection attacks.

In response to determining that the page marked as executable is encrypted, the computational memory program 542 can continue traversing the operating system page table 516 for an additional page marked as executable. In response to finding an additional page marked as executable, the computational memory program 542 can determine whether the additional page marked as executable has been encrypted. If the additional page marked as executable has not been encrypted, the computational memory program 542 can generate a different key and encrypt the additional page marked as executable using the different key. The computational memory program 542 can continue traversing the operating system page table 516 for any page marked as executable and encrypt those executables that are not encrypted. Each encrypted page referenced in the operating system memory table 516 that is encrypted can be encrypted with a unique key, such that each key in the key field 548 of the operating system page table 516 is unique (no two keys are the same).

In some embodiments, in response to determining that the page marked as executable is encrypted, the computational memory program 542 can generate a new key, re-encrypt the requested page using the new key, and store the re-encrypted page in place of the requested page in the memory array 511. The key field 548 for the requested page can be updated with the new key. The re-encrypted page can be decrypted (using the key) and stored in the memory system cache 512 as plaintext.

Figure 6:
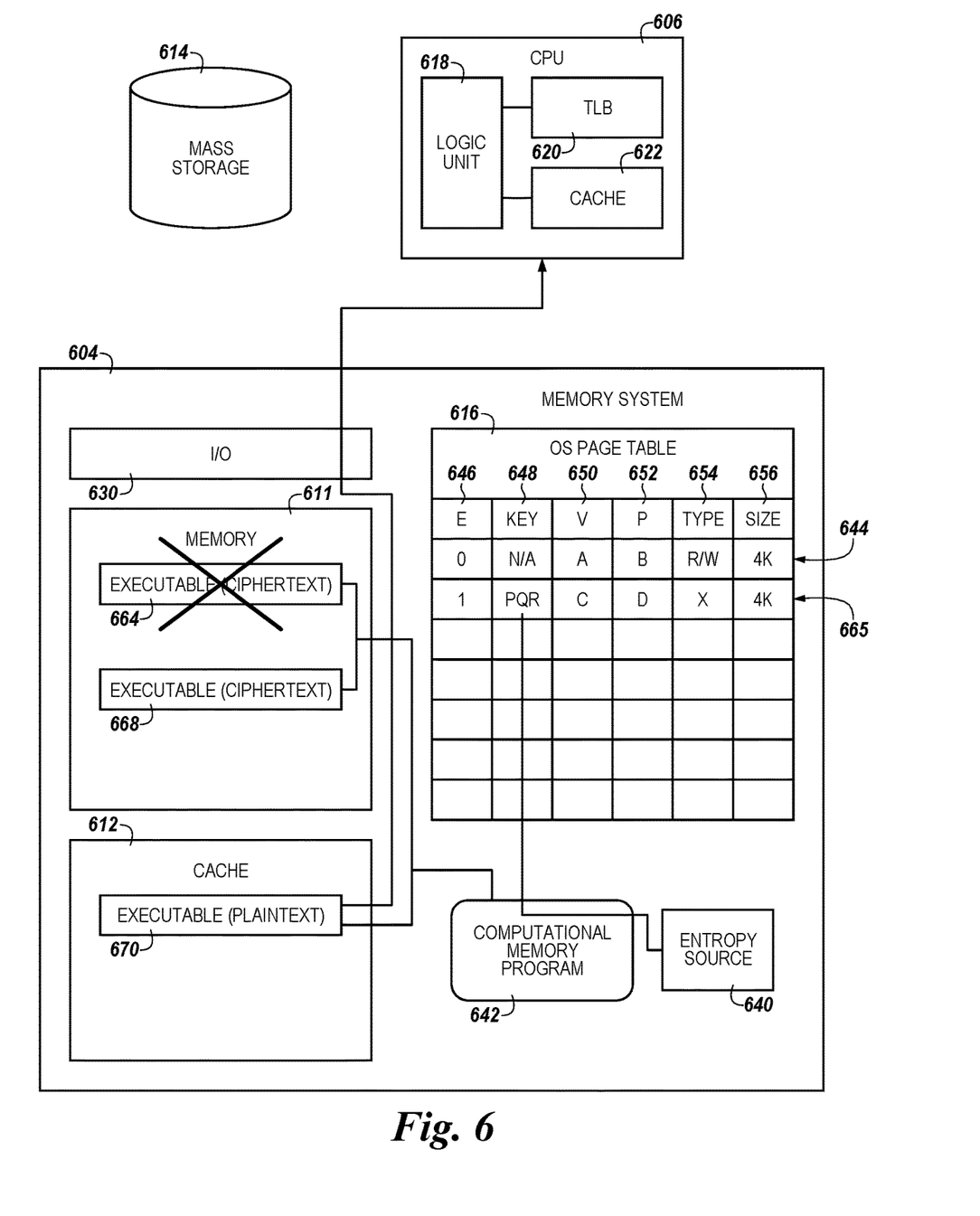
FIG. 6 is a block flow diagram illustrating a subsequent access to an encrypted executable according to a number of embodiments of the present disclosure.

FIG. 6 is a block flow diagram illustrating a subsequent access to an encrypted executable according to a number of embodiments of the present disclosure. FIG. 6 includes an illustration of a mass storage device 614. FIG. 6 includes a CPU 606 including a logic unit 618, TLB 620, and CPU cache 622. FIG. 6 includes a computational memory system 604 including I/O circuitry 630, memory array 611, computational memory system cache 612, operating system page table 616, computational memory program 642, and entropy source 640.

The memory array 611 is illustrated with the ciphertext executable 644, which corresponds to the ciphertext executable 564 illustrated in FIG. 5. In response to a request for the page marked as executable (e.g., the ciphertext page 664), the computational memory program 642 can generate a new key (with the entropy source 640), re-encrypt the page marked as executable using the new key, and store it in place of the page marked as executable. This is illustrated by the lines between the computational memory program 642 and the ciphertext executable 664 and the ciphertext executable 668, which represents the re-encrypted page marked as executable. The x-out of the ciphertext executable 664 represents the ciphertext executable 668 being stored in its place. The computational memory program 642 can delete the third table entry 563 for the ciphertext executable 564 and create a fourth table entry 665 for the ciphertext executable 668.

The computational memory program 642 can mark the ciphertext executable page 668 as being encrypted (e.g., "1") in the encryption indication field 646 of the fourth table entry 665. The new key generated to encrypt the page can be stored in the key field 648 of the fourth table entry 665 (e.g., "PQR"). This is indicated by the line from the entropy source 640 through the computational memory program 642 to the key field 648 in the fourth table entry 665. The virtual memory address (e.g., "C") in the virtual address field 650, the physical address (e.g., "D") in the physical address field 652, the type (e.g., "X") in the type field 654, and the size (e.g., "4k") in the size field 556 for the fourth table entry 665 can remain the same as for the third table entry 563, however embodiments are not so limited, as, for example, the physical address could change.

Although not specifically illustrated in FIG. 6, a new page of executables can be received (e.g., from a host or DMA device) and the computational memory program 642 can generate a new key for the new page (with the entropy source 640). The new page can be encrypted with the new key and stored in the memory array 611. The computational memory program 642 can create a new entry in the operating system page table 616 for the new page, including marking the new page as executable and encrypted.

In some embodiments, the computational memory program 642 can decrypt the re-encrypted page (e.g., the ciphertext executable 668) and store the decrypted page (e.g., as plaintext executable 670) in the computational memory system cache 612 for transfer (e.g., to a host or DMA device) to satisfy a request (to a source of the request). This is illustrated by the lines between the computational memory program 642, the plaintext executable 670, and the ciphertext executable 668 as well as the line between the plaintext executable 670 and the CPU 606. In some embodiments, decrypted executables or unencrypted executables are transferred through the I/O circuitry 630 to a requesting device from the computational memory system cache 612 rather than from the memory array 611 to prevent any injected code from being sent along with the executables as there is no mechanism for injecting code to the computational memory system cache 612. Even if ciphertext executables in the memory array 611 are injected with malicious code, the decryption of the executable will render the injected code meaningless because it would not have been injected in an encrypted form with the same key used to encrypt the executable. Therefore the decryption process would compromise the malicious code. The executable with the compromised malicious code may not function for its intended purpose (it may generate an error), but the malicious code will not execute (e.g., it may cause a halt, prefetch abort, or crowbar the pipeline), but the virus would not spread.

Although not specifically illustrated as such, a non-transitory computing device readable medium for storing executable instructions can include all forms of volatile and non-volatile memory, including, by way of example, semiconductor memory devices, DRAM, PIM, HMC, EPROM, EEPROM, flash memory devices, magnetic disks such as fixed, floppy, and removable disks, other magnetic media including tape, optical media such as compact discs (CDs), digital versatile discs (DVDs), and Blu-Ray discs (BD). The instructions may be supplemented by, or incorporated in, ASICs. For example, any one or more of the secondary storage 114, the CPU cache 122, and/or the memory array 111 illustrated in FIG. 1, can be a non-transitory computing device readable medium.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
a computational memory; and
a host coupled to the computational memory and including a central processing unit;
wherein the host is configured with an operating system;
wherein the operating system is configured to:
launch a computational memory program in the computational memory to maintain an operating system page table in the computational memory; and
thereafter abdicate responsibility of the operating system page table with respect to encryption.

2. The system of claim 1, wherein the operating system is configured to launch the computational memory program on startup.

3. The system of claim 1, wherein the operating system is configured to store the operating system page table in the computational memory, and wherein the operating system page table includes:
an indication of whether a respective page is encrypted;
a respective key for each page that is encrypted;
a virtual address corresponding to the respective page;
a physical address corresponding to the respective page; and
a marking of a type of the respective page.

4. The system of claim 1, wherein the host further includes a translation lookaside buffer (TLB) coupled to the central processing unit;
wherein the operating system is configured to store operating system page table entries that map virtual addresses to physical addresses in the TLB; and
wherein the operating system is configured not to store the operating system page table in the TLB.

5. The system of claim 1, wherein the host further includes a central processing unit cache;
   wherein the operating system page table is not cached in the central processing unit cache to preserve coherence between information in the operating system page table, the central processing unit, and the computational memory.

6. The system of claim 1, wherein the host further includes a mass storage coupled to the central processing unit and configured to store pages of executables;
   wherein the operating system is configured to load a page of executables from the mass storage to the computational memory as plaintext by direct memory access; and
   wherein the computational memory is configured to create a table entry in the operating system page table to correspond to the plaintext page of executables.

7. The system of claim 6, wherein the computational memory is configured to mark the plaintext page of executables as not being encrypted in the operating system page table.

8. The system of claim 6, wherein the host further includes a translation lookaside buffer (TLB) coupled to the central processing unit;
   wherein the host is configured to transmit a virtual memory address corresponding to the plaintext page of executables from the TLB to the computational memory.

9. The system of claim 6, wherein the operating system is configured to load the page of executables in response to a page fault by the computational memory corresponding to the page of executables.

10. The system of claim 6, wherein the computational memory, via the computational memory program, is configured to
    generate a key for the plaintext page of executables; and
    encrypt the plaintext page of executables using the key.

11. A non-transitory computer readable medium storing instructions executable by a processor to:
    execute an operating system for a host;
    launch a computational memory program in a computational memory coupled to the host to maintain an operating system page table in the computational memory; and
    thereafter abdicate responsibility of the operating system page table with respect to encryption.

12. The medium of claim 11, further including instructions to:
    store operating system page table entries that map virtual addresses to physical addresses in a translation lookaside buffer (TLB) of the host; and
    not including instructions to store the operating system page table in the TLB.

13. The medium of claim 12, further including instructions to preserve coherence between information in the operating system page table, the processor, and the computational memory by not caching the operating system page table in a processor cache.

14. The medium of claim 11, further including instructions to:
    load a page of executables from a mass storage of the host to the computational memory as plaintext by direct memory access;
    create, via the computational memory program, a table entry in the operating system page table to correspond to the plaintext page of executables.

15. The medium of claim 14, further including instructions to:
    generate, via the computational memory program, a key for the plaintext page of executables; and
    encrypt, via the computational memory program, the plaintext page of executables using the key.

16. A method, comprising:
    executing an operating system for a host;
    launching a computational memory program in a computational memory coupled to the host to maintain an operating system page table in the computational memory; and
    thereafter abdicating responsibility of the operating system page table with respect to encryption.

17. The method of claim 16, further comprising:
    storing operating system page table entries that map virtual addresses to physical addresses in a translation lookaside buffer (TLB) of the host; and
    not storing the operating system page table in the TLB.

18. The method of claim 17, further comprising preserving coherence between information in the operating system page table, the host, and the computational memory by not caching the operating system page table in a processor cache of the host.

19. The method of claim 16, further comprising:
    loading a page of executables from a mass storage of the host to the computational memory as plaintext by direct memory access;
    creating, via the computational memory program, a table entry in the operating system page table to correspond to the plaintext page of executables.

20. The method of claim 19, further comprising:
    generating, via the computational memory program, a key for the plaintext page of executables; and
    encrypting, via the computational memory program, the plaintext page of executables using the key.

* * * * *